Figure 2:
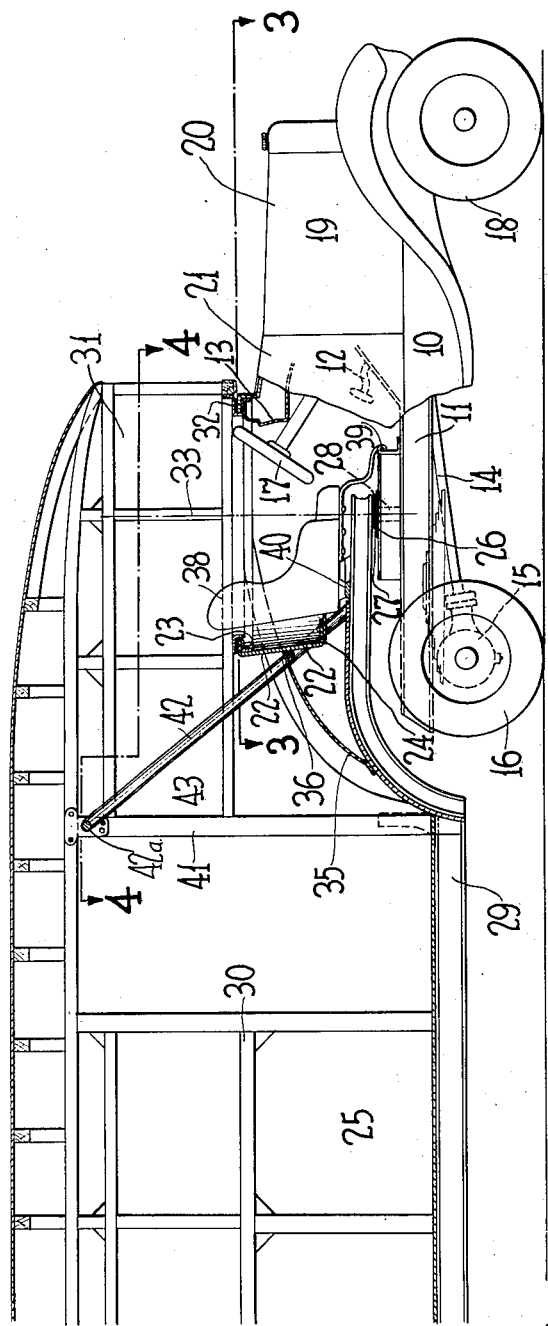

Nov. 13, 1934.    G. H. CURTISS    1,980,613
MOTOR VEHICLE
Original Filed April 1, 1931    3 Sheets-Sheet 1
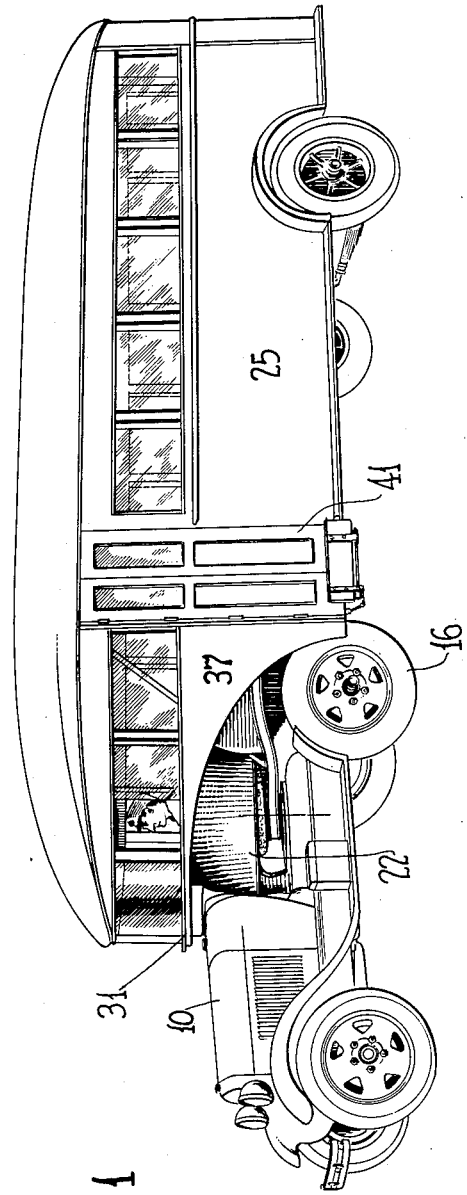
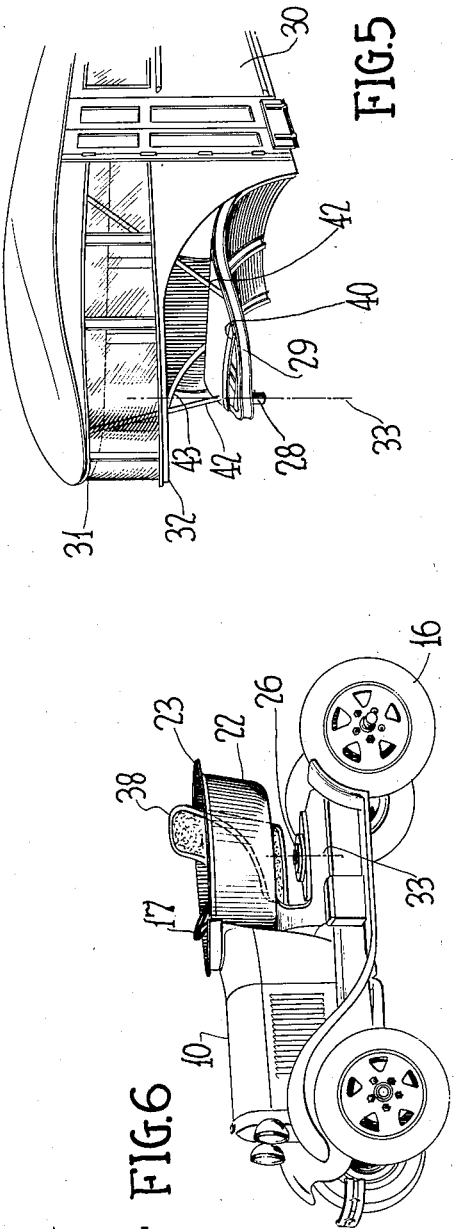
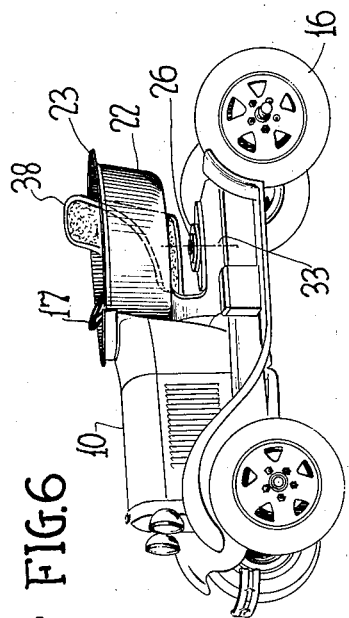
INVENTOR.
GLEN H. CURTISS, DECEASED.
BY LENA P. CURTISS, EXECUTRIX.
BY
ATTORNEY.

Nov. 13, 1934.  G. H. CURTISS  1,980,613
MOTOR VEHICLE
Original Filed April 1, 1931   3 Sheets-Sheet 2

INVENTOR.
GLEN H. CURTISS. DECEASED.
BY. LENA P. CURTISS. EXECUTRIX.

ATTORNEY.

Nov. 13, 1934.　　　G. H. CURTISS　　　1,980,613
MOTOR VEHICLE

Original Filed April 1, 1931　　3 Sheets-Sheet 3

INVENTOR.
GLEN.H.CURTISS.DECEASED.
By. LENA. P.CURTISS.EXECUTRIX.
BY

ATTORNEY.

Patented Nov. 13, 1934

1,980,613

UNITED STATES PATENT OFFICE 1,980,613

MOTOR VEHICLE

Glenn H. Curtiss, deceased, late of Country Club Estates, Fla., by Lena P. Curtiss, executrix, Miami Springs, Fla., assignor to Curtiss Aerocar Company, Inc., a corporation of Florida Application April 1, 1931, Serial No. 526,920
Renewed January 30, 1934

19 Claims. (Cl. 280—33.1)

The invention relates to vehicles of the combined tractor and trailer type in which the tractor carries the power plant and an operator while the trailer carries the usual load other than the operator. Such vehicles have commonly heretofore been built in which the tractor is a four wheel automobile of standard type, and the trailer is a two wheel vehicle connected thereto by a fifth wheel appropriately founded upon the body or directly upon the chassis of the tractor. Commonly the fifth wheel has been mounted on the body of the vehicle or directly upon the chassis in a position above the rear axle or between the rear axle and the driver's seat. The tractor and the trailer have had separate and non-communicating body structures.

The prime object of the present invention is to give to such vehicles inter-communicating body structures whereby passengers in the tractor have open access to passengers in the trailer and vice versa. Very considerable advantages flow from such an arrangement, especially when the vehicle is used as a bus to carry pay passengers, for the driver of the vehicle as seated on the tractor has complete survey, access to and command of the interior of the trailer in which his passengers are received.

In furtherance of this advantage a door for entrance and exit from the trailer is located closely adjacent the region of inter-connection between the tractor and the trailer whereby the operator may communicate immediately with entering and exiting passengers for the purpose of collecting fares, receiving and transmitting directions, etc.

Further objects of the invention are the complete housing of the body structures and the rendition of the intercommunicating regions of the bodies of the tractor and trailer as nearly weatherproof as possible in spite of the relative movement necessarily provided on account of the fifth wheel connection, and the arrangement of the fifth wheel, tractor housing, operator's seat and trailer housing in a vertically superimposed relation to give the operator a maximum of freedom and facility for movement and at the same time a complete access to all controls of the tractor.

Another important object is the location of the fifth wheel connection as far forwardly on the tractor as possible whereby to attain a better distribution of the trailer load as between the four wheels of a four wheel tractor and a better tractor action upon the trailer. Located forwardly of the rear wheels when the rear wheels are driving wheels, the trailer is really pushed rather than dragged by reason of the pushing of the tractor upon the forwardly located fifth wheel. This factor makes for considerably greater ease in handling and regular behavior upon a roadway irrespective of road irregularities and speeds of travel. There is a remarkable freedom from whipping and weaving of the trailer even in making turns at high speed.

Figure 3:
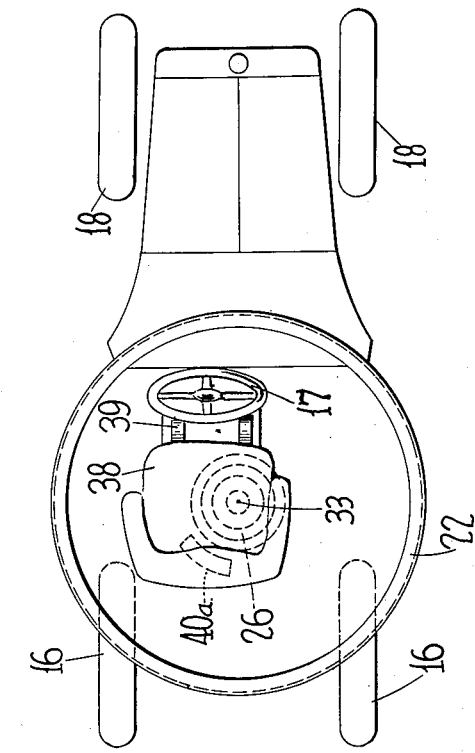
Figure 4:
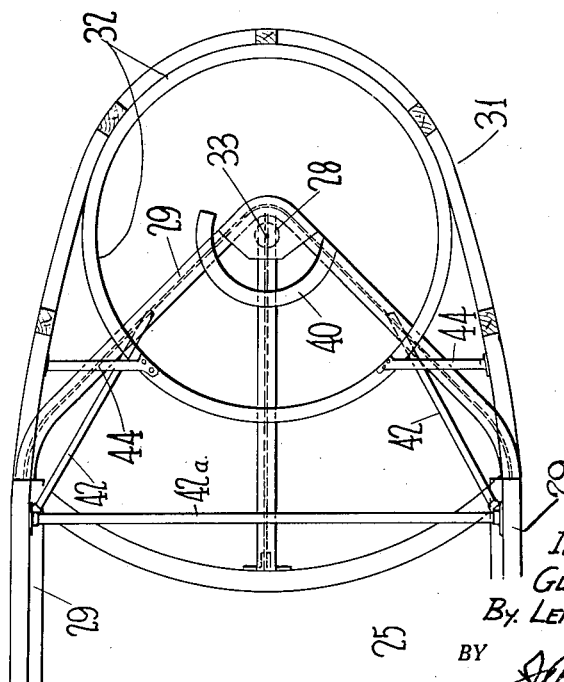

In the accompanying drawings the invention is shown as follows:

A general perspective in Figure 1;

A section in the longitudinal plane of symmetry in Figure 2;

A plan view of the tractor approximately on line 3—3 of Fig. 2 in Figure 3;

A sectional plan view showing the frame elements of the fore part of the trailer approximately on line 4—4 of Fig. 2 in Figure 4;

A three quarter front perspective of the trailer alone in Fig. 5 and a similar view of the fore part of the trailer in Fig. 6.

The tractor 10 is of the form of a standard four wheel automobile. It is provided with a chassis 11 of conventional form and a power plant not shown but the controls of which are indicated as a foot pedal 12 and generally by an instrument board 13. It is a rear drive car as indicated by the transmission shaft 14 and differential 15 connected with the rear wheels 16. A steering wheel 17 substantially in the usual position connects with the front wheels 18 for steering.

This structure is provided with a fore body housing 19 for the motor head 20 and a cowl 21 as shown. These are substantially of the conventional form. The after body, however, is distinctly of non-conventional form. It comprises a substantially circular housing 22 open at top and bottom and supported in a manner not shown from the cowl unit 21 of the fore body 19. Its top 23 is approximately in the same horizontal plane as the top of the cowl unit 21. Its bottom 24 is raised a substantial distance above the chassis frame 11 of the tractor. The after body 22 is of sheet metal as shown having an inner frame of appropriate angle irons the details of which are not of especial moment but sufficient to give it adequate strength in its cantilever support from the cowl unit 21.

The trailer 25 is connected with the tractor through fifth wheel 26, the connection being made in the space between the bottom of the after body 22 and the chassis 11 of the tractor and preferably substantially centrally of the circular after body 22. This fifth wheel may be of any desired construction but is preferably the pneumatic fifth wheel the subject of prior Patent No. 1,916,967, July 4, 1934. The pneumatic portion of the connection 27 is connected directly with the chassis 11. The king or center pin 28 of the connection is connected with the convergent and upraised fore end of the chassis 29 of the trailer 25 as is common practice.

On the chassis 29 of trailer 25 is built an enclosed body superstructure 30 the fore end 31 of which is in open communication with the main body 30 and is extended over the after body 22 of the tractor 10 in superimposed relation thereto and in open communication therewith through the open top 23. Particularly the fore end 31 of the superstructure 30 of the trailer has its bottom 32 annularly formed in concentric and weatherproof telescoping relation to the annular top 23 of the after body 22 of the tractor, and the fifth wheel 26, after body 22 of the tractor and fore body 31 of the trailer are centered about the same vertically extending axis 33. The manner of telescoping and the extent of weatherproofing are details not concerned in the generic spirit of the invention.

Suffice it only that the housing walls of the after body 22 and the fore body 31 substantially meet very closely and that the joint is appropriately overlaid with weatherproofing material having inconsequential resistance to relative movement yet keeping the same weatherproof. The weatherproofing is completed by bringing up the flooring 35 of the trailer over the raised fore end of the chassis 29 into weatherproof annular relation to the after body 22 at its upper edge 36. Outwardly the sheathing 37 of the trailer is cut away to admit turning of the tractor at substantially right angles to the longitudinal axis of the trailer, but not cut away so far as to open the body of the trailer upwardly of the flooring 35 to the weather.

A seat for a driver is carried by the tractor within the after body 22 and in a position to accommodate the driver jointly within the space of the body 22 and the space of the trailer body 31. This seat 38 is forwardly hinged at 39 so that it may be swung forwardly to give access to the fifth wheel and permit the same to be raised to the extent afforded by the space between chassis 29 and the bottom of after body 22 to uncouple the trailer. But in commercial operation the seat rests in the position shown with its rear bearing through a wearing plate 40ᵃ on a track 40 carried by the fore end of the chassis 29, whereby not unduly to strain the hinges 39. This track is arcuate about the axis 33 and appropriate antifriction means may be employed between it and the seat. The center of the seat is preferably on axis 33. A doorway 41 to permit entrance and exit of passengers to the trailer is provided forwardly and closely adjacent the rear of the driver's seat 38.

The fore end of chassis 29 is braced by struts 42 to the superstructure of the closed body trailer, preferably to the frame of doorway 41 as shown. A cross brace 42ᵃ ties the sides together. The fore end 31 of the superstructure diverging from the fore end 29 of the chassis upwardly to superimposed relation to the after body 22 is shaped and braced by the upwardly angling members 43 which connect directly with the annular bottom 32 of the fore body 31.

With this understanding the constructions through which the principal and the auxiliary objects of the invention have been obtained, its advantages should be self-apparent. The after body 22 and the fore body 31 or tractor and trailer respectively, through their open intercommunication in their superimposed relation afford the driver of the vehicle full access to the interior of the trailer at all times where he may wait upon patrons and properly conduct his vehicle with full protection for himself and patrons alike from all adverse weather conditions, and easily receive directly from patrons fares offered upon their entering or exiting from the adjoining trailer door. At the same time, being seated on the tractor during driving, he is always facing forwardly directly in the direction of movement of the tractor and during turning, faced partway around toward the passengers which the vehicle is carrying so that he may command the interior of the vehicle without taking his attention from the roadway and without uncomfortable turning from the driving position with the possibility of impaired control of the vehicle. The open communication between the passenger accommodating space afforded by the structure of the after body 22 and that afforded by the superimposed structure 31 affords every freedom and comfort of movement for the driver at all times.

Innumerable variations in the construction that has been devised may be achieved without departing from the spirit of the invention. Accordingly in the annexed claims there should be imposed no limitations not growing out of the prior art itself and each and all terms should be rendered independently of their circumstantial choice.

What is claimed as new and useful and desired to protect by Letters Patent is:

1. A vehicle of the character described comprising a tractor having an operator accommodating structure and a passenger carrying trailer connected therewith and including a portion forming a superimposed operator accommodating portion in open communication vertically with the operator accommodating structure of the tractor, which operator accommodating structures meet annularly in a substantial horizontal plane and on a center vertically in alignment with the connection of the trailer with the tractor.

2. In a vehicle of the character described comprising a tractor having an annular operator accommodating structure connected with its body, and a trailer having a fifth wheel connection with said tractor and a passenger accommodating structure having an extended annular operator accommodating portion, which annular extending portions and fifth wheel are arranged about a common vertically extending axis.

3. In a vehicle of the character described comprising a tractor having an annular operator accommodating structure connected with its body, and a trailer having a fifth wheel connection with said tractor and a passenger accommodating structure having an extended, annular, operator accommodating portion, which annular extending portions and fifth wheel are arranged about a common vertically extending axis, and in order from bottom to top fifth wheel structure, operator accommodation of the tractor and operator accommodation of the trailer.

4. In a vehicle of the character described comprising a tractor having an annular operator accommodating structure connected with its body, and a trailer having a fifth wheel connection with said tractor and a passenger accommodating structure having an extended, annular, operator accommodating portion, which annular extending portions and fifth wheel are arranged about a common vertically extending axis, and in order from bottom to top fifth wheel structure, operator accommodation of the tractor and operator accommodation of the trailer, together with a seat carried by the tractor in such position as to accommodate the operator jointly in both of said structures.

5. In a vehicle of the character described comprising a tractor having an annular operator accommodating structure connected with its body, and a trailer having a fifth wheel connection with said tractor and a passenger accommodating structure having an extended, annular, operator accommodating portion, which annular extending portion and fifth wheel are arranged about a common vertically extending axis, and in order from bottom to top fifth wheel structure, operator accommodation of the tractor and operator accommodation of the trailer, together with a seat hinged to the tractor forwardly as respects the fifth wheel structure and overlying the fifth wheel in such position as to accommodate a seated operator in both said structures.

6. A vehicle of the character described comprising a tractor having a vertical, annular housing carrying operating controls within its body, a trailer pivotally connected therewith and having a superimposed housing structure in open communication with said control housing structure, said annular housing being in vertical axial alignment with said pivotal connection.

7. A vehicle of the character described comprising a four wheel tractor having a fore body in the form of a usual automobile, an after body of annular form opening to the chassis of the tractor at its bottom, a trailer having a fifth wheel connection between the open bottom of said after body and the chassis of the tractor, and a superstructure having a weatherproof connection annularly and in open communication with the top of said annular after body of the tractor together with an operator's seat carried by the tractor above the fifth wheel and supporting the operator interiorly of the trailer superstructure.

8. A tractor trailer combination which comprises a tractor vehicle, a semi-trailer vehicle having a fifth wheel connection with the tractor vehicle, said vehicles having intercommunicating articulated bodies, the connection between the bodies comprising a vertical cylindrical body portion carried by one of the vehicles and positioned in axial alignment with the fifth wheel, and a horizontal circular opening formed in the body of the other vehicle in which said vertical cylindrical portion is telescoped.

9. A tractor trailer combination which comprises a tractor vehicle, a semi-trailer vehicle having a fifth wheel connection with the tractor vehicle, said vehicles having intercommunicating articulated bodies, the connection between the bodies comprising a vertical cylindrical body portion open at the top, carried by the tractor and forming a body closure for the operator's seat and the tractor controls, said cylindrical portion being positioned in axial alignment with the fifth wheel, and a horizontal circular opening formed in the underside of the forward end of the trailer body, said opening being telescoped over the upper annular edge of said cylindrical portion.

10. A tractor trailer combination which comprises a tractor vehicle, a semi-trailer vehicle having a fifth wheel connection with the tractor vehicle, said vehicles having intercommunicating articulated bodies, the connection between the bodies comprising a vertical cylindrical body portion, open at the top, carried by the tractor and forming a body closure for the operator's seat and the tractor controls, said cylindrical portion being positioned in axial alignment with the fifth wheel, and a horizontal circular opening formed in the underside of the forward end of the trailer body, said opening making an articulated weather proof engagement with the upper annular edge of said cylindrical portion.

11. A tractor trailer combination which comprises a tractor vehicle the rear body portion of which is in the form of a vertical cylinder, open at its upper end, which surrounds the operator's seat and the tractor controls, a trailer vehicle having a body closure the forward part of which is in the form of a vertical cylinder telescoped over the cylindrical portion of the tractor body, and means to connect the two vehicles for articulated movement including a fifth wheel positioned beneath and in axial alignment with the cylindrical body portions of the vehicles.

12. In a vehicle of the character described comprising a tractor having an operator's seat supporting structure for carrying the operator on the tractor, a passenger carrying trailer swively coupled to said tractor, said trailer having an operator accommodating body portion superimposed on said tractor and formed with a substantially horizontal circular opening in vertical communication with said seat structure so as to accommodate the operator within the trailer body portion, the rim of said opening being in close proximity to said seat structure and the center of said trailer body opening being on the same vertical axis as the center of said swivelled coupling between the tractor and trailer.

13. A vehicular combination of the character described comprising a tractor provided with operating controls, and a passenger carrying trailer, having an enclosed body, connected to the tractor by a fifth wheel coupling, the forward portion of the body of said trailer being provided on its under side with a substantially horizontal circular opening through which said tractor controls are operable, an operator's seat secured to the tractor to turn therewith and extending through said opening to position the operator within the body of the tractor, and an arcuate support secured to the trailer upon which the seat rides, said opening being coaxial with the fifth wheel coupling.

14. A vehicular combination of the character described comprising a tractor, a passenger carrying trailer having a closed body, a fifth wheel coupling connecting the tractor and trailer, the underside of the forward portion of said body being elevated to extend over the rear portion of the tractor and provided with a substantially horizontal opening positioned in coaxial relation with the fifth wheel coupling to maintain the underlying portion of the tractor in communication with the interior of the body of the trailer in all angular positions of the tractor and trailer, a seat connected to the underlying portion of the tractor to turn therewith and an arcuate support secured to the trailer upon which said seat rides.

15. A vehicular combination comprising a tractor provided with operating controls, a passenger carrying trailer, having an enclosed body connected to the tractor by a fifth wheel coupling, the forward portion of the body of said trailer being provided on its under side with a substantially horizontal circular opening positioned in coaxial relation with the fifth wheel coupling to establish communication between the underlying portion of the tractor, including the tractor controls, and the interior of the trailer body, a seat connected to said underlying portion of the tractor and an arcuate support secured to the trailer upon which said seat rides.

16. A vehicular combination comprising a tractor provided with operating controls and an operator's seat, and a passenger carrying trailer, having an enclosed body, connected to the tractor by a fifth wheel coupling, the forward portion of the body of said trailer being closed except for a circular opening in a horizontal plane and having its center concentric with said fifth wheel coupling, said opening forming means by which said seat is connected to the tractor to turn therewith and position the operator within the trailer body and render said operating controls accessible to the operator, said opening also providing means whereby a substantially 180° arc of relative turning movement between the tractor and trailer is permitted.

17. A vehicular combination comprising a tractor, a trailer having a closed body, a fifth wheel coupling connecting the tractor and trailer, the forward portion of said body extending over the rear portion of the tractor, said extending portion being closed except for a substantially horizontal opening positioned in coaxial relation with the fifth wheel coupling to maintain the underlying portion of the tractor in communication with the interior of the body of the trailer throughout substantially 180° of relative angular movement of the tractor and trailer.

18. A semi-trailer vehicle adapted to be connected by a fifth wheel coupling to a tractor vehicle and provided with an enclosed body, the under side of the forward portion of said body being elevated to extend over the rear portion of the tractor, said forward portion of the body being closed except for a circular opening in a horizontal plane and positioned to be brought into coaxial relation with the fifth wheel coupling to bring the underlying portion of the tractor into communication with the interior of the body of the trailer through said opening.

19. A vehicular combination comprising a tractor provided with operating controls, a trailer having a closed body, the forward portion of said body being upwardly offset to extend over the rear portion of the tractor at an elevation sufficient to permit the tractor to turn through an arc of substantially 180° with respect to the trailer, a fifth wheel coupling connecting the trailer to the tractor, the upwardly offset portion of the trailer being provided on its under side with a circular opening in a horizontal plane, said opening being concentric with the fifth wheel coupling, and a seat for positioning an operator within the body of the trailer, said seat being connected by way of said opening to the tractor to turn therewith, said operating controls being operable through said opening.

LENA P. CURTISS,
*Executrix of Estate of Glenn H. Curtiss, Deceased.*